United States Patent [19] [11] Patent Number: 4,705,421
Depping [45] Date of Patent: Nov. 10, 1987

[54] COUPLING BETWEEN A SHAFT AND A HUB

[76] Inventor: Herbert Depping, Schwagestr. 81, 7928 Giengen, Fed. Rep. of Germany

[21] Appl. No.: 935,037

[22] Filed: Nov. 26, 1986

[30] Foreign Application Priority Data

Dec. 11, 1985 [DE] Fed. Rep. of Germany ....... 3543672

[51] Int. Cl.⁴ .............................................. F16D 9/00
[52] U.S. Cl. ..................................... 403/2; 403/5; 403/15
[58] Field of Search ........................... 403/15, 31, 5, 2; 29/113 R, 113 AD

[56] References Cited

U.S. PATENT DOCUMENTS 4,264,229 4/1981 Falk et al. .............................. 403/5

FOREIGN PATENT DOCUMENTS 879490 6/1953 Fed. Rep. of Germany .
1546699 5/1979 United Kingdom .
456929 2/1975 U.S.S.R. ................................. 403/5

OTHER PUBLICATIONS

Publication "Konstruktion", dated Jan. 3, 1951, No. 11, "Dehndorne"-Dr.-Ing. O. Kienzle.

Primary Examiner—Andrew V. Kundrat
Attorney, Agent, or Firm—Jeffers, Hoffman & Niewyk

[57] ABSTRACT

A releasable coupling between a shaft and a hub is provided, which coupling includes a device operable by a pressure medium to produce a pressure lack between the shaft and the hub.

13 Claims, 2 Drawing Figures

COUPLING BETWEEN A SHAFT AND A HUB

The present invention relates to a releasable coupling between a shaft and a hub comprising a device operated by a pressure medium which produces a pressure lock between shaft and hub, according to the generic term of claim 1.

Such a coupling is known from DE-OS No. 27 07 530. There, the torsion-resistant pressure connection based on friction is achieved by a cylindrical clamping sleeve fitted between the shaft and the borehole in the hub. The clamping sleeve has an internal cylindrical chamber, a passage from this chamber to the atmosphere and a plug for closing the passage, whereby the internal chamber can be put under high internal pressure. The resulting deformation or radial expansion of the clamping sleeve then produces a high surface pressure both on the external surface of the shaft and on that of the borehole in the hub, this surface pressure permitting the transmission of a torque by means of friction. The coupling is released by relieving the internal chamber, e.g. by the plug being broken off when the transmissible torque is exceeded and a relative rotation takes place between hub and shaft as is known from DE-OS No. 2923 902. Under the internal pressure in the clamping sleeve, the hub experiences a specific increase in its diameter, depending on its particular shape. The clamping sleeve constitutes a radially elastic element between hub and shaft. In cases where high radial forces are acting on the hub, such as in rolling mills, this might result in undesirable geometrical inaccuracies due to elastic deformation. During rotation, the clamping sleeve is in these cases subject to a dynamic continuous stress. It if consists of an inner and an outer part welded together at the front ends and containing the pressurized chamber, there will be a danger of fatigue fracture at the welds and interruption of the torque transmission.

The object of the present invention is to provide a coupling of the described type avoiding the above disadvantages and permitting smaller overall dimensions.

While according to the conventional method a clamping sleeve is arranged between shaft and hub which has to transmit the full torque, the invention proposes the use of a clamping sleeve at a point where there is no dynamic stress acting on it. The hub is mounted directly on the shaft and the clamping sleeve expandable under internal pressure is located inside the shaft. When the pressure chamber is pressurized, the shaft radially expands and presses into the hole of the hub, thereby permitting a direct transmission of torque between the components concerned, namely shaft and hub. The advantages of this are as follows:

Both the parts forming the clamping sleeve and the weld which has to seal the unit against high internal pressure are only loaded statically. The deformation work caused by radial force and torque does not occur in the internally pressurized clamping sleeve but in the shaft. A friction lock is only required between shaft and hub, i.e. on two surfaces concerned, whereas with the conventional method a total of four surfaces is involved in the transmission of torque by friction. Furthermore, the method according to the invention eliminates shear stress on the weld caused by the torque, and there is no relative radial displacement between hub and shaft caused by the radial elasticity of an intermediate element. Arrangement of the hub directly on the shaft permits the use of smaller diameter hubs.

Preferred embodiments of the invention are described in the subordinate claims. According to these, the clamping element can be designed as a separate part with facilities for applying a pressure medium. The shaft is hollow at least at its end so that the clamping element can be inserted into it. For ensuring an optimum connection, the clamping element can be axially shifted inside the shaft to accommodate it to any axial adjustment of the hub required by the operating conditions. The hub can be equipped with a device, such as a disc, shearing off a breakable plug at the end of the clamping element in a way known per se when the permissible torque is exceeded and a relative rotation takes place. This coupling variant can also be used as safety coupling.

Another aspect of the invention is that the clamping element to which the pressure medium is applied is only one additional part which is inserted into the hollow shaft end. It constitutes the inner part filling the borehole, whereas the hollow shaft end itself is the outer part. The chamber containing the pressure medium is formed between the inner borehole of the shaft end and the external surface of the inserted inner part, the only joint resulting from this at the end of the shaft and the inserted inner part being made pressure-tight e.g. by means of a weld. The inserted inner part can take the form of a solid plug or, to save material, of a tube-shaped sleeve with a bottom at the end. The plug for pressure medium supply should preferably be located on the end face of the insertable inner part or, alternatively, on that of the shaft. In principle, it is also possible to arrange it somewhere on the external surface on the shaft outside the coupling area for the hub.

Furthermore, this design is suitable for use as a safety coupling with positive shearing off of the plug. This design is suitable for solid shafts which, unlike hollow shafts, permit the installation of a clamping element operated by a pressure medium in the area of the rotary axis without torque transmission being influenced.

The invention will now be described in detail with reference to the accompanying drawing.

Figure 1:
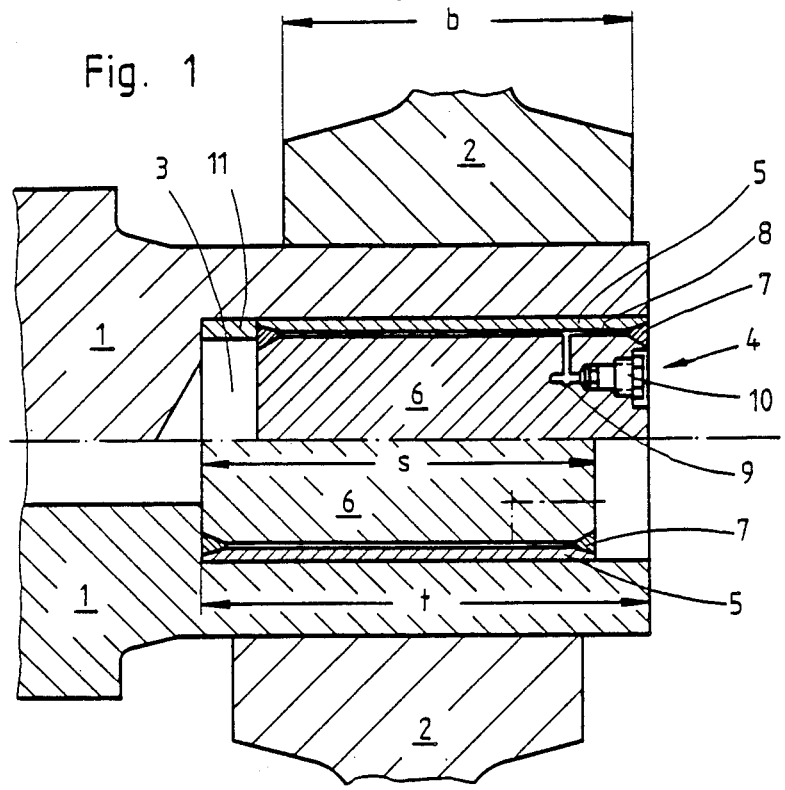
FIG. 1 is a longitudinal section through a couling according to the invention.

Identical parts are marked with the same numbers in both figures. FIG. 1 shows the end of a shaft 1 on which a hub 2 such as a gearwheel, roll, or flange is located for transmitting a torque onto it. The shaft 1 has a rotary axis and coaxial borehole 3 extending from the end face into which a clamping element 4 is inserted. This element consists of an outer part 5 and an inner part 6 connected with each other in a pressure-tight manner, e.g. by means of welds 7. Between the outer part 5 and the inner part 6 there is formed a narrow chamber 8 as described above which, only for the purpose of clear representation, is shown here unproportionally wide. This chamber is connected via a passage 9 with a plug 10, through which a pressure medium is applied. As will be known per se, the application of an internal pressure to chamber 8 produces a radial expansion of the outer part 5 and thus of the shaft end 1, whereby a frictional connection is formed with the seat of hub 2.

Many applications may require the axial position of hub 2 on shaft 1 to be changed during assembly. In order to guarantee reliable connection also under these conditions it may be advisable to make the depth t of shaft hole 3 deeper than the axial length b of hub 2 and the length s of clamping element 4. As illustrated in the upper half of FIG. 1, it is also possible when mounting hub 2 near the end of the shaft to introduce the clamping element 4 into borehole 3 only to a depth such that hub 2 can be locked from inside in a way favourable for loading. A spacer ring 11 may be fitted at the bottom of hole 3 for this purpose. On the lower half of FIG. 1 the hub 2 is shown shifted in a direction away from the end face of shaft 1 and clamping element 4 has been inserted up to the bottom of hole 3. Also shown there is that shaft 1 may be designed as a hollow shaft right from the beginning whereas on the upper half of FIG. 1 it is shown as a solid shaft.

The axial distance between clamping element 4 and the hole bottom 3 may in any case be of advantage for obtaining a transition area of favourable stress conditions in the tubular end of shaft 1 between the solid shaft section and the section under internal pressure carrying the hub 2.

Figure 2:
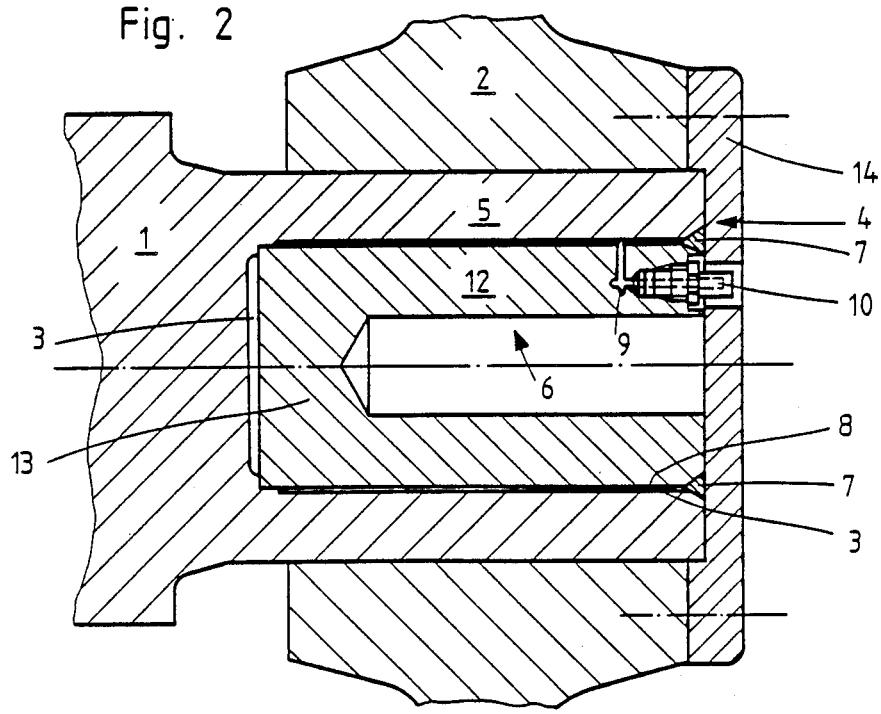
FIG. 2 is a longitudinal section through a different embodiment wherein the clamping element is incorporated into the shaft and an overload protection is provided.

FIG. 2 illustrates an embodiment of the invention wherein the clamping element is an integral part of the shaft 1. The outer part 5 of the clamping element 4 is formed by the tubular end of shaft 1 itself, into which an inner part 6 designed as a tube 12 with bottom 13 is inserted and connected by means of one single weld 7. The chamber 8 pressurized from inside is formed by the cylindrical inner surface of borehole 3 and the outer surface of inner part 6 and is connected to a plug 10 via a passage 9 as described above. The advantage of this configuration is that fewer precision-manufactured parts are needed and that there is only one weld. This results in cost savings.

Also shown is a disc 14 connected with the hub in a torsionally rigid manner, this disc reaching so far radially inward that the plug 10 at the front end of the clamping element is covered. When the permissible torque is exceeded, plug 10 is sheared off as described above by a relative rotational movement, the torque transmission being interrupted by relieving chamber 8 of pressure. This safety device can of course also be fitted to a coupling according to FIG. 1.

I claim:

1. A coupling forming a disengageable connection between a shaft and a hub, said coupling operable to transmit power between said shaft and said hub and comprising:

said shaft including a rotary axis and defining a first end with an end face and a borehole at said end face having a borehole bottom, which borehole is coaxial with said rotary axis;

said hub defines a seat, which hub is mounted at said seat on said shaft;

an expandable clamping element coaxially inserted in said borehole, which clamping element has a front end, an inner part and an outer part, which inner and outer parts cooperate to define a chamber therebetween, which chamber receives a pressure medium to provide a pressure lock through surface pressure radially and internally applied to said hub seat;

said inner part defining a passage communicating between said chamber and atmosphere;

a closing device for applying the pressure medium, which closing device is mounted at said clamping element front end facing said shaft front end to close said passage, said closing device including a plug removable to relieve the pressure in said chamber; and, a device for moving said plug to relieve said pressure, which device is attached to said hub and movable by relative rotation between said shaft and said hub.

2. A coupling device as claimed in claim 1 wherein said device for moving said plug is a disc attached to said hub.

3. Coupling according to claim 1 wherein the depth (t) of the coaxial borehole (3) accommodating the clamping element (4) in shaft (1) is greater than the axial length (b) of the hub and the axial length(s) of the clamping element (4).

4. A coupling according to claim 3 wherein the outer part (5) of the clamping element inside is formed by the shaft (1) carrying the hub (2) and wherein an inner part (6) is inserted into the coaxial hole (3) of shaft (1) whose external cylindrical surface forms a chamber (8) with the cylindrical inner surface of hole (3) for the pressure medium, has a bottom (13) at the front end, and is connected with shaft (1) in a pressure-tight manner, e.g. by means of a weld (7).

5. A coupling according to claim 1 wherein the depth (t) of the coaxial borehole (3) accommodating the clamping element (4) in shaft (1) is greater than the axial length (b) of the hub and the axial length(s) of the clamping element (4).

6. A coupling according to claim 5 wherein the outer part (5) of the clamping element inside is formed by the shaft (1) carrying the hub (2) and wherein an inner part (6) is inserted into the coaxial hole (3) of shaft (1) whose external cylindrical surface forms a chamber (8) with the cylindrical inner surface of hole (3) for the pressure medium, has a bottom (13) at the front end, and is connected with shaft (1) in a pressure-tight manner, e.g. by means of a weld (7).

7. A coupling according to claim 1 wherein the depth (t) of the coaxial borehole (3) accommodating the clamping element (4) in shaft (1) is greater than the axial length (b) of the hub and the axial length(s) of the clamping element (4).

8. A coupling according to claim 7 wherein the outer part (5) of the clamping element inside is formed by the shaft (1) carrying the hub (2) and wherein an inner part (6) is inserted into the coaxial hole (3) of shaft (1) whose external cylindrical surface forms a chamber (8) with the cylindrical inner surface of hole (3) for the pressure medium, has a bottom (13) at the front end, and is connected with shaft (1) in a pressure-tight manner, e.g. by means of a weld (7).

9. Coupling according to claim 1 wherein the outer part (5) of the clamping element inside is formed by the shaft (1) carrying the hub (2) and wherein an inner part (6) is inserted into the coaxial hole (3) of shaft (1) whose external cylindrical surface forms a chamber (8) with the cylindrical inner surface of hole (3) for the pressure medium, has a bottom (13) at the front end, and is connected with shaft (1) in a pressure-tight manner, e.g. by means of a weld (7).

10. A coupling according to claim 1 wherein the outer part (5) of the clamping element inside is formed by the shaft (1) carrying the hub (2) and wherein an inner part (6) is inserted into the coaxial hole (3) of shaft (1) whose external cylindrical surface forms a chamber (8) with the cylindrical inner surface of hole (3) for the pressure medium, has a bottom (13) at the front end, and is connected with shaft (1) in a pressure-tight manner, e.g. by means of a weld (7).

11. A coupling according to claim 1 wherein the outer part (5) of the clamping element inside is formed by the shaft (1) carrying the hub (2) and wherein an inner part (6) is inserted into the coaxial hole (3) of shaft (1) whose external cylindrical surface forms a chamber (8) with the cylindrical inner surface of hole (3) for the pressure medium, has a bottom (13) at the front end, and is connected with shaft (1) in a pressure-tight manner, e.g. by means of a weld (7).

12. A coupling according to claim 1 wherein the outer part (5) of the clamping element inside is formed by the shaft (1) carrying the hub (2) and wherein an inner part (6) is inserted into the coaxial hole (3) of shaft (1) whose external cylindrical surface forms a chamber (8) with the cylindrical inner surface of hole (3) for the pressure medium, has a bottom (13) at the front end, and is connected with shaft (1) in a pressure-tight manner, e.g. by means of a weld (7).

13. A coupling according to claim 1 wherein the outer part (5) of the clamping element inside is formed by the shaft (1) carrying the hub (2) and wherein an inner part (6) is inserted into the coaxial hole (3) of shaft (1) whose external cylindrical surface forms a chamber (8) with the cylindrical inner surface of hole (3) for the pressure medium, has a bottom (13) at the front end, and is connected with shaft (1) in a pressure-tight manner, e.g. by means of a weld (7).

* * * * *